United States Patent [19]
Faraj

[11] Patent Number: 6,051,680
[45] Date of Patent: Apr. 18, 2000

[54] SILYLATED DOUBLE METAL CYANIDE COMPLEX CATALYSTS

[75] Inventor: Mahmoud K. Faraj, Newtown Square, Pa.

[73] Assignee: Arco Chemical Technology, L.P., Greenville, Del.

[21] Appl. No.: 09/093,553

[22] Filed: Jun. 8, 1998

[51] Int. Cl.[7] .............................. C08G 59/68; C08G 65/04
[52] U.S. Cl. ......................... 528/412; 502/158; 502/240; 502/253; 502/260; 528/414; 528/417
[58] Field of Search .................................. 502/158, 240, 502/253, 260; 528/410, 412, 414, 417

[56] References Cited

U.S. PATENT DOCUMENTS

| | | | |
|---|---|---|---|
| 3,404,109 | 10/1968 | Milgrom | 260/611 |
| 3,829,505 | 8/1974 | Herold | 260/611 |
| 4,472,560 | 9/1984 | Kuyper et al. | 526/120 |
| 4,477,589 | 10/1984 | Van der Hulst et al. | 502/169 |
| 5,470,813 | 11/1995 | Le-Khac | 502/175 |
| 5,478,920 | 12/1995 | Drysdale | 528/410 |
| 5,482,908 | 1/1996 | Le-Khac | 502/156 |
| 5,545,601 | 8/1996 | Le-Khac | 502/156 |
| 5,627,120 | 5/1997 | Le-Khac | 502/156 |
| 5,627,122 | 5/1997 | Le-Khac | 502/175 |
| 5,639,705 | 6/1997 | Bowman et al. | 502/175 |
| 5,693,584 | 12/1997 | Le-Khac | 502/159 |
| 5,712,216 | 1/1998 | Le-Khac et al. | 502/175 |
| 5,714,428 | 2/1998 | Le-Khac | 502/159 |
| 5,783,513 | 7/1998 | Combs et al. | 502/175 |

OTHER PUBLICATIONS

Livigni et al., "Poly(Propylene Ether) Polyois Prepared With a Zinc Hexacyanocobaltate Complex Catalyst," *ACS Symposium Series*, No. 6, pp. 20–37 (1975).

Kuyper et al., "Hexacyanometallate Salts Used as Alkene–Oxide Polymerization Catalysts and Molecular Sieves", *J. Catalysts*, 105, pp. 163–174 (1987).

Herold et al., "Hexacyanometalate Salt Complexes as Catalysts for Epoxide Polymerization", *Advances in Chemistry Series*, No. 128 (Polymerization Kinetics and Technology), pp. 208–229 (1973).

*Primary Examiner*—Robert Dawson
*Assistant Examiner*—Dave Aylward
*Attorney, Agent, or Firm*—Stephen D. Harper; Jonathan L. Schurchardt

[57] ABSTRACT

The amount of high molecular weight impurity present in a polyether polyol produced by alkoxylation of an active hydrogen-containing initiator using a double metal cyanide complex catalyst may be advantageously lowered by treating the catalyst prior to use in polymerization with a silylating agent. Suitable silylating agents include trialkyl halosilanes and trialkyl alkyoxysilanes. The higher purity polyether polyols thereby produced are particularly useful in the preparation of slab and molded polyurethane foams, which tend to collapse or become excessively tight when elevated levels of high molecular tail are present in the polyether polyol.

28 Claims, No Drawings

SILYLATED DOUBLE METAL CYANIDE COMPLEX CATALYSTS

FIELD OF THE INVENTION

This invention pertains to a method of enhancing the performance of a double metal cyanide complex catalyst. More particularly, the invention relates to contacting such a catalyst with a silylating agent whereby the silylated catalyst thus obtained is capable of producing polyether polyols having reduced levels of high molecular tail. Such polyether polyols have enhanced processing latitude in the preparation of molded and slab polyurethane foam.

BACKGROUND OF THE INVENTION

Polyurethane polymers are prepared by reacting a di- or polyisocyanate with a polyfunctional, isocyanate-reactive compound, in particular, hydroxyl-functional polyether polyols. Numerous art-recognized classes of polyurethane polymers exist, for example cast elastomers, polyurethane RIM, microcellular elastomers, and molded and slab polyurethane foam. Each of these varieties of polyurethanes present unique problems in formulation and processing.

Two of the highest volume categories of polyurethane polymers are polyurethane molded and slab foam. In slab foam, the reactive ingredients are supplied onto a moving conveyor and allowed to rise freely. The resulting foam slab, often 6 to 8 feet (2 to 2.6 m) wide and high, may be sliced into thinner sections for use as seat cushions, carpet underlay, and other applications. Molded foam may be used for contoured foam parts, for example, cushions for automotive seating.

In the past, the polyoxypropylene polyether polyols useful for slab and molded foam applications have been prepared by the base-catalyzed propoxylation of suitable hydric initiators such as propylene glycol, glycerine, sorbitol, etc., producing the respective polyoxypropylene diols, triols, and hexols. As is now well documented, a rearrangement of propylene oxide to allyl alcohol occurs during base-catalyzed propoxylation. The monofunctional, unsaturated allyl alcohol bears a hydroxyl group capable of reaction with propylene oxide, and its continued generation and propoxylation produces increasingly large amounts of unsaturated polyoxypropylene monols having a broad molecular weight distribution. As a result, the actual functionality of the polyether polyols produced is lowered significantly from the "normal" or "theoretical" functionality. Moreover, the monol generation places a relatively low practical limit on the molecular weight obtainable. For example, a base catalyzed 4000 Da (Dalton) molecular weight (2000 Da equivalent weight) diol may have a measured unsaturation of 0.05 meq/g, and will thus contain 30 mol percent unsaturated polyoxypropylene monol species. The resulting actual functionality will be only 1.7 rather than the "nominal" functionality of 2 expected for a polyoxypropylene diol. As this problem becomes even more severe as molecular weight increases, preparation of polyoxypropylene polyols having equivalent weights higher than about 2200–2300 Da is impractical using conventional base catalysis.

Double metal cyanide ("DMC") complex catalysts such as zinc hexacyanocobaltate complexes were found to be catalysts for propoxylation about 30 years ago. However, their high cost, coupled with modest activity and the difficulty of removing significant quantities of catalyst residues from the polyether product, hindered commercialization. The unsaturation level (i.e., "monol" level) of polyoxypropylene polyols produced by these catalysts was found to be low, however.

The relatively modest polymerization activity of these conventional double metal cyanide-complex catalysts has been recognized as a problem by workers in the field. Recently, as indicated by U.S. Pat. Nos. 5,470,813, 5,482,908, 5,545,601, and 5,712,216, researchers at ARCO Chemical Company have produced substantially amorphous DMC complex catalysts with exceptional activity, which have also been found to be capable of producing polyether polyols having unsaturation levels in the range of 0.002 to 0.007 meq/g (levels previously obtainable only through the use of certain solvents such as tetrahydrofuran). The polyoxypropylene polyols thus prepared were found to react in a quantitatively different manner from prior "low" unsaturation polyols in certain applications, notably cast elastomers and microcellular foams. However, substitution of such polyols for their base-catalyzed analogs in molded and slab foam formulations is not straightforward. In molded foams, for example, foam tightness increases to such an extent that the necessary crushing of the foams following molding is difficult if not impossible. In both molded foams and slab foams, foam collapse often occurs, rendering such foams incapable of production. These effects occur even when the high actual functionality of such polyols is purposefully lowered by addition of lower functionality polyols to achieve an actual functionality similar to that of base-catalyzed polyols.

DMC-catalyzed polyoxypropylene polyols have exceptionally narrow molecular weight distribution, as can be seen from viewing gel permeation chromatograms of polyol samples. The molecular weight distribution is often far more narrow than analogous base-catalyzed polyols, particularly in the higher equivalent weight range, for example. Polydispersities less than 1.5 are generally obtained, and polydispersities in the range of 1.05 to 1.15 are common. In view of the low levels of unsaturation and low polydispersity, it was surprising that DMC-catalyzed polyols did not prove to be "drop-in" replacements for base-catalyzed polyols in polyurethane foam applications. Because propoxylation with modern DMC catalysts is highly efficient, it would be very desirable to be able to produce DMC-catalyzed polyoxypropylene polyols which can be used in slab and molded polyurethane foam applications without causing excessive foam tightness or foam collapse.

SUMMARY OF THE INVENTION

It has now been discovered that polyether polyols which contain polymerized propylene oxide and which mimic the behavior of base-catalyzed analogs in slab and molded polyurethane foams may be obtained using a double metal cyanide complex catalyst if the catalyst is first treated with a silylating agent.

DETAILED DESCRIPTION OF THE INVENTION

Intensive research into the chemical and physical characteristics of polyoxypropylene polyols has led to the discovery that despite the narrow molecular weight distribution and low polydispersities of polyols catalyzed by substantially amorphous highly active double metal cyanide complex catalysts, small high molecular weight fractions are responsible in large part for excessive foam tightness (stabilization) and foam collapse.

A comparison of gel permeation chromatograms of base-catalyzed and DMC-catalyzed polyols exhibit significant differences. For example, a base-catalyzed polyol exhibits a significant "lead" portion of low molecular weight oligomers and polyoxypropylene monols prior to the main molecular weight peak. Past the peak, the weight percentage of higher molecular weight species falls off rapidly. A similar chromatogram of a DMC-catalyzed polyol reveals a tightly centered peak with very little low molecular weight "lead" portion, but with a higher molecular weight portion (high molecular weight "tail") which shows the presence of measurable species at very high molecular weights. Due to the low concentration of these species, generally less than 2–3 weight percent of the total, the polydispersity is low. However, intensive research has revealed that the higher molecular weight species, despite their low concentrations, are largely responsible for the abnormal behavior of DMC-catalyzed polyols in molded and slab polyurethane foam applications, it is surmised that these high molecular weight species exert a surfactant-like effect which alters the solubility and hence the phase-out of the growing polyurethane polymers during the isocyanate-polyol reaction.

By fractionation and other techniques, it has been determined that the high molecular weight tail may be divided into two molecular weight fractions based on the different effects these fractions influence. The first fraction, termed herein "intermediate molecular weight tail," consists of polymeric molecules having molecular weights ranging from about 20,000 Da to 400,000 Da, and greatly alters the foam tightness in molded foam and high resilience (HR) slab foam. A yet higher molecular weight fraction (hereinafter, "ultra-high molecular weight tail") dramatically influences foam collapse both in molded foam and in slab foam of both conventional and high resilience (HR) varieties.

Thus far, no completely effective method of avoiding production of high molecular weight tail during propoxylation employing DMC complex catalysts has been known in the art. Use of processes such as continuous addition of starter in both batch and continuous polyol preparation, as disclosed in WO 97/29146 and U.S. Pat. No. 5,689,012, have proven partially effective in lowering the amount of high molecular weight tail in some cases. However, the portion which remains is still higher than is optimal if the polyether polyol is to be used for preparation of polyurethane foam. Commercially acceptable methods for removing or destroying high molecular weight tail have also not been developed. Destruction of high molecular weight species by cleavage induced by peroxides is somewhat effective, but also cleaves the desired molecular weight species as well. Fractionation with supercritical $CO_2$ is effective with some polyols but not others, and is too expensive to be commercially acceptable.

It has been observed that the double metal cyanide complex catalysts that contain higher levels of free (unbonded) zinc hydroxyl groups ("Zn—OH") tend to be the catalysts which produce polyether polyols having higher amounts of high molecular tail impurity. Without wishing to be bound by theory, it is thought that the zinc hydroxyl groups are in some way involved in the formation of such impurities.

It has unexpectedly been found that the problem of reducing the high molecular tail in a polyether polyol obtained using a double metal cyanide complex catalyst may be readily solved by contacting the catalyst with a silylating agent for a time and at a temperature effective to introduce silyl groups into the catalyst.

The silylating agent may be an organic substance capable of acting as a source of silyl groups and is generally characterized by having at least one substituent capable of being replaced by a reactive component of the double metal cyanide complex catalyst such as, for example, free zinc hydroxyl groups. Without wishing to be bound by theory, it is believed that the improvements in catalyst performance realized by application of the present invention are at least in part due to the reaction of the silylating agent with the zinc hydroxyl groups or other deleterious sites initially present in the catalyst. That is, it has been observed that when the catalyst is treated with the silylating agent, the infrared absorption bands assigned to free (unassociated) Zn—OH are largely eliminated, possibly due to the conversion of such groups to Zn—O—Si—$(R)_3$ groups (where the silylating agent has the structure X—Si—$(R)_3$, for example).

Suitable silylating agents includes the organosilanes, organosilylamines and organosilazanes. One generally preferred class of silylating agents are the tetrasubstituted silanes having from 1 to 3 hydrocarbyl substituents, such as, for example, trimethyl chlorosilane, dichlorodimethylsilane, chlorobromodimethylsilane, nitrotrimethylsilane, chlorotriethylsilane, iododimethylbutylsilane, chlorodimethylphenylsilane, ethoxytrimethylsilane, methoxytrimethylsilane, chlorotriphenylsilane, chlorotripropyl silane, chlorotrihexylsilane, and the like. Very suitable silylating agents of the class comprise the tetrasubstituted silanes wherein at least one substituent is halogen (e.g., F, Cl, Br, I) or alkoxy (e.g., OR where R preferably is a $C_1$–$C_4$ hydrocarbyl group) and at least one substituent is a hydrocarbyl group containing preferably from 1 to 4 carbon atoms. Particularly preferred silylating agents of this type correspond to the formula $(X)_a$—Si—$(R)_b$ where X is a halogen or alkoxide (e.g., $C_1$–$C_4$ alkoxy), the R groups are the same or different and are selected from alkyl (e.g., $C_1$–$C_4$ alkyl), aryl (e.g., phenyl), or alkyl aryl (e.g. tolyl, benzyl) groups, a is 1 or 2, b is 2 or 3, and a+b is 4.

Another suitable class of silylating agents are the organosilazanes, particularly the organodisilazanes. These molecules may be represented by the formula

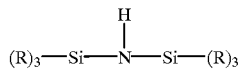

wherein the six R groups are the same or different and are organic groups or hydrogen. Preferably, the organosilazane contains R groups which are independently H or alkyl groups of up to about 8 carbon atoms. The organosilizane preferably contains 4–6 lower alkyl groups, each containing from 1 to 4 carbon atoms, and 0 to 2 hydrogens as the R groups. The organosilizanes generally are symmetrical due to their method of production, but may also be asymmetrical. Suitable organosilizanes include, for example, 1,2-diethyidisilazane, 1,1,2,2-tetramethyl disilzane, 1,1,1,2,2,2-hexamethyl disilazane, and 1,2-diisopropyl disilazane.

Other classes of suitable silylating agents correspond to the formula X—Si—$(R)_3$ wherein the R groups are the same or different and are independently selected from hydrogen, alkyl, aryl or alkaryl and X is selected from

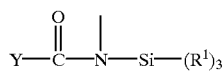

or an imidazolyl group, where Y is an alkyl or halogenated alkyl group such as methyl or trifluoromethyl and $R^1$ has the same meaning as R. A suitable silylating agent of this type is bis(trimethyl silyl) acetamide.

To effect the improving silylation, the double metal cyanide complex catalyst is contacted with a suitable silylating agent as herein defined at a temperature effective to accomplish reaction of the silylating agent with the catalyst. Excessively high temperatures, however, should be avoided because of the possibility that the catalyst may undergo chemical and/or physical transformations at such temperatures wherein the performance of the catalyst (such as, for example, activity) is adversely affected to an unacceptable extent. Although the optimum temperature will vary depending on the silylating agent selected, the contacting conditions (e.g., liquid vs. vapor phase), and the composition of the catalyst, generally speaking temperatures in the range of from 20° C. to 125° C. will be satisfactory.

The desired contacting may be accomplished in a variety of manners. For example, the catalyst (which will generally be in particulate form) may be admixed with the silylating agent in a liquid phase. The liquid phase may contain a suitable non-reactive solvent such as an ether, hydrocarbon or the like, in addition to the silylating agent. After the desired contacting time has elapsed, any liquid phase remaining may be removed from the silylated catalyst by conventional methods such as filtration, decantation, and/or evaporation. Alternatively, the catalyst particles may be contacted with a stream of silylating agent in the vapor phase. The silylation may be carried out as a batch, semi-continuous or continuous process.

The length of time required for the silylating agent to react with the double metal cyanide complex catalyst depends in part on the temperature and agent employed. Lower temperatures, for example, generally require longer reaction times. Highly reactive silylating agents will generally not require reaction times as long as less reactive silylating agents. Typically, however, contact times of from 0.1 to 48 hours will suffice.

The amount of silylating agent employed can vary widely. Amounts of silylating agent of from 0.1% by weight to 100% by weight, based on the weight of the double metal cyanide complex catalyst, are generally preferred. Any excess unreacted silylating agent can, of course, be separated from the catalyst after silylation and recycled. The silylating agent can be applied to the catalyst either in one treatment or in a series of treatments. Generally, a single treatment is preferred for reasons of operating economy.

The optimum amount of silylating agent incorporated with the catalyst will vary depending upon a number of factors, including, for instance, the composition and other characteristics of the starting double metal cyanide complex catalyst. Sufficient silyl groups should be introduced so as to result in a silylated catalyst which yields a lower proportion of high molecular weight tail when used to catalyze the production of a polyether polyol than the same catalyst prior to silylation. Typically, Si levels in the catalyst after silylation range from 0.1 weight % to 20 weight %. In some cases, however, even lower levels may suffice to effect an improvement in catalyst performance.

The double metal cyanide catalysts treated with the silylating agent are preferably substantially amorphous (in this context, meaning that no sharp intense peaks are visible in an x-ray diffraction pattern) and are comprised of a double metal cyanide, an organic complexing agent and a metal salt. Such catalysts generally have very high polymerization activity; i.e., they are typically capable of polymerizing propylene oxide at a rate in excess of 3 g (more preferably, 5 g) propylene oxide per minute per 250 ppm catalyst (based on the combined weight of initiator and propylene oxide) at 105° C. Double metal cyanide complex catalysts meeting these requirements and methods for their preparation are described in detail in U.S. Pat. Nos. 5,470,813, 5,482,908, 5,545,601, and 5,712,216, each of which is incorporated herein by reference in its entirety. Other double metal cyanide complex catalysts known in the epoxidation art may also be silylated in accordance with the present invention.

The double metal cyanide most preferably is zinc hexacyanocobaltate, while the metal salt (used in excess in the reaction to form the double metal cyanide) is preferably selected from the group consisting of zinc halides (zinc chloride being especially preferred), zinc sulphate and zinc nitrate. The organic complexing agent is desirably selected from the group consisting of alcohols, ethers and mixtures hereof, with water soluble aliphatic alcohols such as tert-butyl alcohol being particularly preferred. The double metal cyanide complex catalyst is desirably modified with a polyether, as described in U.S. Pat. Nos. 5,482,908 and 5,545,601.

The concentration of the silylated catalyst when used in an epoxide polymerization process is generally selected such that sufficient catalyst is present to polymerize the epoxide at a desired rate or within a desired period of time. It is desirable to minimize the amount of catalyst employed, both for economic reasons and to avoid having to remove the catalyst from the polyether polyol produced. The activities of the catalysts obtained by practice of this invention are extremely high; catalyst concentrations in the range of from 5 to 50 parts per million based on the combined weight of active hydrogen-containing initiator and epoxide thus are typically sufficient.

The catalysts obtained by practice of this invention are particularly useful for polymerizing propylene oxide alone since propylene oxide homopolymerization is particularly apt to form undesirably high levels of high molecular weight tail. However, the process may also be employed to polymerize other epoxides such as ethylene oxide, 1-butene oxide and the like, either alone or in combination with other epoxides. For example, copolymers of ethylene oxide and propylene oxide may be produced.

The active hydrogen-containing initiator may be any of the substances known in the art to be capable of alkoxylation by epoxide using a double metal cyanide complex catalyst and is selected based on the desired functionality and molecular weight of the polyether polyol product. Typically, the initiator (which may also be referred to as "starter") will be oligomeric in character and have a number average molecular weight in the range of from 100 to 1000 and a functionality (number of active hydrogens per molecule) of from 2 to 8. Alcohols (i.e., organic compounds containing one or more hydroxy groups) are particularly preferred for use as initiators.

The polymerization may be conducted using any of the alkoxylation procedures known in the double metal cyanide complex catalyst art. For instance, a conventional batch process may be employed wherein the silylated catalyst and initiator are introduced into a batch reactor. The reactor is then heated to the desired temperature (e.g., 70 to 150° C.) and an initial portion of epoxide introduced. Once the catalyst has been activated, as indicated by a drop in pressure and consumption of the initial epoxide charge, the remainder of the epoxide is added incrementally with good mixing of the reactor contents and reacted until the desired molecular weight of the polyether polyol product is achieved. The initiators, monomers and polymerization conditions described in U.S. Pat. No. 3,829,505 (incorporated herein by reference in its entirety) may be readily adapted for use in the present process.

Alternatively, a conventional continuous process may be employed whereby a previously activated initiator/catalyst mixture is continuously fed into a continuous reactor such as a continuously stirred tank reactor (CSTR) or tubular reactor. A feed of epoxide is introduced into the reactor and the product continuously removed. The process of this invention may also be readily adapted for use in continuous addition of starter (initiator) processes, either batch or continuous operation, such as those described in detail in WO 97/29146 (corresponding to U.S. application Ser. No. 08/597,781, filed Feb. 7, 1996, now U.S. Pat. No. 5,777,177), and U.S. Pat. No. 5,689,012, both of which are incorporated herein by reference in their entirety.

The polyether polyols produced by operation of the process of the invention preferably have functionalities, molecular weights and hydroxyl numbers suitable for use in molded and slab foams. Nominal functionalities range generally from 2 to 8. In general, the average functionality of polyether polyol blends ranges from about 2.5 to 4.0. The polyether polyol equivalent weights generally range from somewhat lower than 1000 Da to about 5000 Da. Unsaturation is preferably 0.015 meq/g or lower, and more preferably in the range of 0.002 to about 0.008 meq/g. Hydroxyl numbers preferably range from 10 to about 80. Blends may, of course, contain polyols of both lower and higher functionality, equivalent weight, and hydroxyl number.

The performance of polyether polyols may be assessed by testing these polyether polyols in the "Tightness Foam Test" (TFT) and "Super Critical Foam Test" (SCFT). Polyether polyols which pass these tests have been found to perform well in commercial slab and molded foam applications, without excessive tightness, and without foam collapse. The SCFT consists of preparing a polyurethane foam using a formulation which is expressly designed to magnify differences in polyether polyol behavior.

In the SCFT, a foam prepared from a given polyether polyol is reported as "settled" if the foam surface appears convex after blow-off and is reported as collapsed if the foam surface is concave after blow-off. The amount of collapse can be reported in a relatively quantitative manner by calculating the percentage change in a cross-sectional area taken across the foam. The foam formulation is as follows: polyether polyol, 100 parts; water, 6.5 parts; methylene chloride, 15 parts; Niax® A-1 amine-type catalyst, 0.10 parts; T-9 tin catalyst, 0.34 parts; L-550 silicone surfactant, 0.5 parts. The foam is reacted with a mixture of 80/20 2,4- and 2,6-toluene diisocyanate at an index of 110. The foam may be conveniently poured into a standard 1 cubic foot cake box, or a standard 1 gallon ice cream container. In this formulation, conventionally prepared, i.e. base catalyzed polyether polyols having high secondary hydroxyl cause the foam to settle approximately 10–20%, generally 15%±3%, whereas polyether polyols prepared from DMC catalysts containing unacceptably high levels of high molecular weight tail cause the foam to collapse by approximately 35–70%.

While the SCFT is used to assess differences in foam stability, the Tightness Foam Test (TFT) magnifies reactivity differences, as reflected by foam porosity. In the tightness foam test, the resin component consists of 100 parts polyether polyol, 3.2 parts water (reactive blowing agent), 0.165 parts C-183 amine catalyst, 0.275 parts T-9 tin catalyst, and 0.7 parts L-620 silicone surfactant. The resin component is reacted with 80/20 toluene diisocyanate at an index of 105. Foam tightness is assessed by measuring air flow in the conventional manner. Tight foams have reduced air flow.

The analytical procedure useful for measuring the quantity of high molecular weight tail in a given DMC-catalyzed polyether polyol is a conventional HPLC technique, which can easily be developed by one skilled in the art. The molecular weight of the high molecular weight fraction may be estimated by comparing its elution time in the GPC column with that of a polystyrene standard of appropriate molecular weight. As is well known, high molecular weight fractions elute from a GPC column more rapidly than lower molecular weight fractions, and to aid in maintaining a stable baseline, it is appropriate, following the elution of the high molecular weight fraction, to divert the remainder of the HPLC eluate to waste, rather than allowing it to pass through the detector, overloading the latter. Although many suitable detectors may be utilized, a convenient detector is an evaporative light scattering detector (ELSD) such as those commercially available.

In the preferred analysis method, a Jordi Gel DVB $10^3$ Angstrom column, 10×250 mm, 5 micron particle size, is employed with a mobile phase which consists of tetrahydrofuran. The detector used is a Varex Model IIA evaporative light scattering detector. Polystyrene stock solutions are made from polystyrenes of different molecular weights by appropriate dilution with tetrahydrofuran, to form standards containing 2, 5, and 10 mg/L of polystyrene. Samples are prepared by weighing 0.1 gram of polyether polyol into a 1 ounce bottle, and adding tetrahydrofuran to the sample to bring the total weight of sample and tetrahydrofuran to 10.0 grams. Samples of the 2, 5, and 10 mg/L polystyrene calibration solutions are sequentially injected into the GPC column. Duplicates of each polyether polyol sample solution are then injected, following by a reinjection of the various polystyrene standards. The peak areas for the polystyrene standards are electronically integrated, and the electronically integrated peaks for the two sets of each candidate polyol are electronically integrated and averaged. Calculation of the high molecular weight tail in ppm is then performed by standard data manipulation techniques.

Having generally described this invention, a further understanding can be obtained by reference to certain specific examples which are provided herein for purposes of illustration only and are not intended to be limiting unless otherwise specified.

EXAMPLES

A highly active substantially noncrystalline double metal cyanide complex catalyst comprised of zinc hexacyanocobaltate, zinc chloride, tert-butyl alcohol and a polyether polyol was prepared in accordance with the procedures described in U.S. Pat. No. 5,482,908. The desired quantity of silylating agent (trimethyl chlorosilane or trimethyl ethoxysilane) was dissolved in 30 mL methyl tert-butyl ether. After mixing for 15 minutes, 6 g of the double metal cyanide complex catalyst was added and the resulting mixture heated at 55° C. for 2 hours. The silylated catalyst was subsequently dried under vacuum using a rotary evaporator for 2 hours prior to use in epoxide polymerization.

The catalytic performances of three silylated catalysts prepared using varying ratios of trimethyl chlorosilane/ catalyst were compared to that of the unsilylated catalyst in the preparation of 6000 molecular weight polyether triols. The catalyst (30 ppm in final product), active hydrogen-containing initiator (propoxylated glycerin having a hydroxyl number equal to 240 mg KOH/g), and an initial charge of propylene oxide were heated in a stirred reactor at 105° C. until catalyst activation had been achieved, as indicated by a drop in pressure. The remainder of the propylene oxide was then added incrementally while maintaining a reaction temperature at 105° C.

Gel permeation chromatographic analysis of the polyether triol products obtained demonstrated that silylation of the catalyst effectively reduced the amount of undesired high molecular weight tail formed during polymerization (Table I.)

TABLE 1

| Example | Silylating Agent/ Catalyst Ratio, wt/wt | Mw/Mn | High Molecular Weight Tail[1], ppm |
|---|---|---|---|
| 1* | 0 | 1.098 | 800–1200 |
| 2 | 3/1 | 1.16 | 206 |
| 3 | 0.533/1 | 1.15 | 120 |
| 4 | 0.266/1 | 1.139 | 225 |

*Comparative
[1] >100,000 molecular weight

The catalytic performance of two silylated catalysts prepared using varying ratios of trimethyl ethoxysilane/catalyst were compared to that of the unsilylated catalyst in the preparation of 3000 molecular weight polyether triols. Epoxide polymerizations were carried out as described in the previous example, except that the reaction temperature was 120° C.

As shown in Table II, treatment with trimethyl ethoxysilane effectively lowered the quantity of high molecular weight impurities present in the final polyether polyol product.

TABLE II

| Example | Mw/Mn | Hydroxyl No., mg KOH/g | Unsat., meq/g | High Molecular Weight Impurities >100K, ppm | >400K, ppm |
|---|---|---|---|---|---|
| 5* | 1.10 | 56 | 0.004 | 155 | 15–20 |
| 6 | 1.12 | 55.8 | 0.015 | 105 | nd |
| 7 | 1.13 | 56.2 | 0.017 | 95 | nd |

*Comparative
nd = None detected

I claim:

1. A silylated double metal cyanide complex catalyst.

2. The silylated double metal cyanide complex catalyst of claim 1 wherein said silylated double metal cyanide complex catalyst is comprised of zinc hexacyanocobaltate.

3. The silylated double metal cyanide complex catalyst of claim 1 wherein said silylated double metal cyanide complex catalyst is comprised of a metal salt selected from the group consisting of zinc halides, zinc sulfates, zinc nitrates and mixtures thereof.

4. The silylated double metal cyanide complex catalyst of claim 1 wherein said silylated double metal cyanide complex catalyst is substantially amorphous.

5. The silylated double metal cyanide complex catalyst of claim 1 wherein said silylated double metal cyanide complex catalyst is comprised of 0.1 to 20 weight percent Si.

6. The silylated double metal cyanide complex catalyst of claim 1 wherein said silylated double metal cyanide complex catalyst is comprised of a water soluble aliphatic alcohol.

7. The silylated double metal cyanide complex catalyst of claim 1 wherein said silylated double metal cyanide complex catalyst is comprised of a polyether.

8. A silylated substantially amorphous double metal cyanide complex catalyst comprised of zinc hexacyanocobaltate, a zinc halide, a water soluble aliphatic alcohol, and from 0.1 to 20 weight percent Si.

9. The silylated substantially amorphous double metal cyanide complex catalyst of claim 8 wherein said silylated additionally amorphous double metal cyanide complex catalyst isadditionally comprised of a polyether.

10. A method of enhancing the performance of a double metal cyanide complex catalyst, said method comprising contacting said double metal cyanide complex catalyst with a silylating agent for a time and at a temperature effective to introduce silyl groups into said double metal cyanide complex catalyst.

11. The method of claim 10 wherein the silylating agent corresponds to the formula $$(X)_a-Si-(R)_b$$

wherein X is halide or alkoxide, R is alkyl, aryl or alkylaryl, a is 1 or 2, b is 2 or 3 and a+b is 4.

12. The method of claim 10 wherein from 0.1 to 100 parts by weight of the silylating agent per 100 parts by weight of the double metal cyanide complex catalyst is utilized.

13. The method of claim 10 wherein the temperature is from 20° C. to 125° C.

14. The method of claim 10 wherein said contacting is performed with the silylating agent being present in a liquid phase.

15. The method of claim 10 wherein said contacting is performed with the silylating agent being present in a vapor phase.

16. The method of claim 10 wherein the double metal cyanide complex catalyst is characterized by the presence of zinc hydroxy groups.

17. A method of enhancing the performance of a double metal cyanide complex catalyst characterized by the presence of zinc hydroxy groups, said method comprising contacting said double metal cyanide complex catalyst with at least 0.1 parts by weight, per 100 parts by weight of the double metal cyanide complex catalyst, of a silylating agent corresponding to the formula $(X)_a-Si-(R)_b$ wherein X is halide or alkoxide, R is alkyl, aryl or alkylaryl, a is 1 or 2, b is 2 or 3 and a+b is 4 in a liquid phase at a temperature of 20° C. to 125° C. for a time effective to introduce silyl groups into said double metal cyanide complex catalyst.

18. The method of claim 17 wherein the double metal cyanide complex catalyst is substantially amorphous and is comprised of zinc hexacyanocobaltate, a zinc halide, and a water soluble aliphatic alcohol.

19. The method of claim 17 wherein X is Cl or ethoxide and R is methyl.

20. An epoxide polymerization process comprising reacting an epoxide and an active hydrogen-containing initiator in the presence of a silylated double metal cyanide complex catalyst for a time and at a temperature effective to form a polyether polyol.

21. The epoxide polymerization process of claim 20 wherein the silylated double metal cyanide complex catalyst has been prepared by contacting a double metal cyanide complex catalyst with at least 0.1 parts by weight, per 100 parts by weight of the double metal cyanide complex catalyst, of a silylating agent corresponding to the formula $(X)_a-Si-(R)_b$ wherein X is halide or alkoxide, R is alkyl, aryl or alkylaryl, a is 1 or 2, b is 2 or 3 and a+b is 4 in a liquid phase at a temperature of 20° C. to 125° C. for a time effective to introduce silyl groups into said double metal cyanide complex catalyst.

22. The epoxide polymerization process of claim 20 wherein the polyether polyol has a functionality of 2 to 8 and an equivalent weight of 500 to 5000.

23. The epoxide polymerization process of claim 20 wherein the epoxide is selected from the group consisting of propylene oxide, ethylene oxide and mixtures thereof.

24. The epoxide polymerization process of claim 20 wherein the silylated double metal cyanide complex catalyst is present at a concentration of from 5 to 50 parts per million based on the combined weight of active hydrogen-containing initiator and epoxide.

25. An epoxide polymerization process comprising reacting propylene oxide, either alone or in combination with ethylene oxide, and an alcohol initiator in the presence of a silylated substantially amorphous double metal cyanide complex catalyst comprised of zinc hexacyanocobaltate, a zinc halide, a water soluble aliphatic alcohol and from 0.1 to 20 weight percent Si at a temperature of from 40° C. to 150° C. for a time effective to form a polyether polyol.

26. The epoxide polymerization process of claim 25 wherein the zinc halide is zinc chloride.

27. The epoxide polymerization process of claim 25 wherein the water soluble aliphatic alcohol is tert-butyl alcohol.

28. The epoxide polymerization process of claim 25 wherein the polyether polyol has a functionality of from 2 to 3 and an equivalent weight of from 500 to 5000.

* * * * *